United States Patent
Ohlsen et al.

(10) Patent No.: US 9,184,463 B2
(45) Date of Patent: Nov. 10, 2015

(54) NITRIC ACID REGENERATION FUEL CELL SYSTEMS

(76) Inventors: Leroy J. Ohlsen, Gold Bar, WA (US);
Slobodan Petrovic, Kirkland, WA (US);
David W. Wine, Seattle, WA (US);
Lorne Roy, Seattle, WA (US); Julie Birashk, Mill Creek, WA (US)

( * ) Notice: Subject to any disclaimer, the term of this patent is extended or adjusted under 35 U.S.C. 154(b) by 0 days.

(21) Appl. No.: 10/966,721

(22) Filed: Oct. 15, 2004

(65) Prior Publication Data
US 2005/0084738 A1    Apr. 21, 2005

Related U.S. Application Data

(60) Provisional application No. 60/512,629, filed on Oct. 17, 2003.

(51) Int. Cl.
| | |
|---|---|
| *H01M 8/04* | (2006.01) |
| *H01M 8/18* | (2006.01) |
| *H01M 8/20* | (2006.01) |
| *H01M 8/06* | (2006.01) |
| *H01M 8/10* | (2006.01) |

(52) U.S. Cl.
CPC ............ *H01M 8/18* (2013.01); *H01M 8/04007* (2013.01); *H01M 8/04164* (2013.01); *H01M 8/04291* (2013.01); *H01M 8/0668* (2013.01); *H01M 8/20* (2013.01); *H01M 8/1011* (2013.01); *Y02E 60/528* (2013.01)

(58) Field of Classification Search
None
See application file for complete search history.

(56) References Cited

U.S. PATENT DOCUMENTS

| | | | |
|---|---|---|---|
| 3,261,717 A | 7/1966 | Shropshire et al. |
| 3,281,274 A | 10/1966 | Moerikofer |
| 3,318,735 A | 5/1967 | Tarmy et al. |
| 3,350,227 A | 10/1967 | Moerikofer et al. |
| 3,979,225 A | 9/1976 | Smith et al. |
| 4,528,250 A | 7/1985 | Struthers |

(Continued)

FOREIGN PATENT DOCUMENTS

| | | |
|---|---|---|
| WO | WO 01/72641 A1 | 10/2001 |
| WO | WO 02/086994 | 10/2002 |

(Continued)

OTHER PUBLICATIONS

K.V. Kordesch, 25 Years of Fuel Cell Development, Journal of the Electrochemical Society, Mar. 1978, 18 pgs., vol. 125 No. 3, The Electrochemical Society, U.S.

(Continued)

*Primary Examiner* — Jonathan Crepeau

(57) ABSTRACT

The present invention disclosed herein is directed to nitric acid regeneration fuel cell systems that comprise: an anode; a cathode confronting and spaced apart from the anode; an anolyte flowstream configured to flowingly contact the anode, wherein the anolyte flowstream includes a fuel, preferably methanol, for reacting at the anode; a catholyte flowstream configured to flowingly contact the cathode, wherein the catholyte flowstream includes nitric acid for reacting at the cathode to thereby yield cathode reaction products that include nitric oxide and water in a catholyte effluent flowstream; and a hydrogen peroxide flowstream configured to contact and react hydrogen peroxide with the nitric oxide of the catholyte effluent flowstream at a hydrogen peroxide oxidation zone to thereby yield a regenerated nitric acid flowstream. The regenerated nitric acid flowstream is preferably reused in the catholyte flowstream.

15 Claims, 3 Drawing Sheets

(56) References Cited

U.S. PATENT DOCUMENTS

| | | | |
|---|---|---|---|
| 4,783,381 A | | 11/1988 | Tytgat et al. |
| 5,306,431 A | | 4/1994 | Fischer et al. |
| 5,707,508 A | | 1/1998 | Surma et al. |
| 5,911,868 A | | 6/1999 | Balazs et al. |
| 6,485,851 B1 | | 11/2002 | Narayanan et al. |
| 6,808,840 B2 | | 10/2004 | Mallari et al. |
| 6,811,916 B2 | | 11/2004 | Mallari et al. |
| 7,118,822 B2 | | 10/2006 | Mallari et al. |
| 7,157,177 B2 | | 1/2007 | Chan |
| 7,172,825 B2 | | 2/2007 | Adams et al. |
| 7,205,665 B1 | | 4/2007 | Chung et al. |
| 7,297,430 B2 | * | 11/2007 | Beckmann et al. ............ 429/494 |
| 2002/0028372 A1 | * | 3/2002 | Ohlsen et al. ................... 429/40 |
| 2002/0182479 A1 | | 12/2002 | Mallari et al. |
| 2003/0087141 A1 | | 5/2003 | Sun et al. |
| 2003/0124408 A1 | * | 7/2003 | Hojo et al. ...................... 429/34 |
| 2003/0194598 A1 | | 10/2003 | Chan |
| 2004/0058217 A1 | * | 3/2004 | Ohlsen et al. ................... 429/34 |
| 2004/0072044 A1 | | 4/2004 | Rusek et al. |
| 2005/0023236 A1 | | 2/2005 | Adams et al. |
| 2005/0084737 A1 | * | 4/2005 | Wine et al. ...................... 429/38 |
| 2007/0114485 A1 | | 5/2007 | Adams et al. |

FOREIGN PATENT DOCUMENTS

| | | | |
|---|---|---|---|
| WO | WO 2004/027891 | * | 4/2004 |
| WO | WO 2005/043706 | * | 5/2005 |

OTHER PUBLICATIONS

Sada et al, Absorption of NO Solutions of FeIII-EDTA Chelate and Aqueous Slurries of MgSO3 with FeIII-EDTA Chelate, Ind. Eng. Chem. Process Des. Dev., 1981, 46-49, Japan.

Lin et al, Removal of nitric acid by emulsion liquid membrane, Journal of Membrane Science, 1997, 33-45, 134, New Mexico State University, Las Cruces, NM USA.

Sportsman et al, The dehydration of mitric acid using pervaporation and a nafion perflourosulfonate/perfluorocarboxylate bilayer membrane, 2002, 155-166, 203, Colorado, USA.

* cited by examiner

_US 9,184,463 B2_

NITRIC ACID REGENERATION FUEL CELL SYSTEMS

CROSS-REFERENCE TO RELATED APPLICATION

This application claims the benefit of U.S. Provisional Application No. 60/512,629 filed on Oct. 17, 2003, which application is incorporated herein by reference in its entirety for all purposes.

GOVERNMENT RIGHTS

This invention was made with United States Government support under Advanced Technology Program Award Number 70NANB3H3036 awarded by the National Institute of Standards and Technology (NIST). The United States Government has certain rights in this invention.

TECHNICAL FIELD

The present invention relates generally to fuel cells and, more particularly, to nitric acid regeneration fuel cell systems having a recirculating nitric acid catholyte flowstream that is regenerated with a hydrogen peroxide flowstream, as well as to related methods.

BACKGROUND OF THE INVENTION

A fuel cell is an energy conversion device that consists essentially of two opposing electrodes, an anode and a cathode, ionically connected together via an interposing electrolyte. Unlike a battery, fuel cell reactants are supplied externally rather than internally. Fuel cells operate by converting fuels, such as hydrogen or a hydrocarbon (e.g., methanol), to electrical power through an electrochemical process rather than by combustion. It does so by harnessing the electrons released from controlled oxidation-reduction reactions occurring on the surface of a catalyst. A fuel cell can produce electricity continuously so long as proper reactants are supplied from an outside source.

With respect to state-of-the-art fuel cell systems generally, several different configurations and structures have been contemplated. In this regard, existing fuel cell systems are typically classified based on one or more criteria, such as, for example: (1) the type of fuel and/or oxidant used by the system, (2) the type of electrolyte used in the electrode stack assembly, (3) the steady-state operating temperature of the electrode stack assembly, and (4) whether the fuel is processed outside (external reforming) or inside (internal reforming) the electrode stack assembly. In general, however, it is perhaps most customary to classify existing fuel cell systems by the type of electrolyte (i.e., ion conducting media) employed within the electrode stack assembly. Accordingly, most state-of-the-art fuel cell systems have been classified into one of the following known groups:
  1. Phosphoric acid fuel cells (e.g., phosphoric acid electrolyte);
  2. Alkaline fuel cells (e.g., KOH electrolyte);
  3. Molten carbonate fuel cells (e.g., $Li_2CO_3/K_2CO_3$ electrolyte);
  4. Solid oxide fuel cells (e.g., yttria-stabilized zirconia electrolyte);
  5. Proton exchange membrane fuel cells (e.g., NAFION electrolyte).

Unfortunately, existing state-of-the-art fuel cell systems are not entirely satisfactory for the production of small-scale portable direct feed fuel cell systems, in part, because of problems associated with achieving a small form factor while maintaining a relatively high power density. In addition, existing fuel cell technology has not addressed many of the concomitant problems associated with closed circulating microfluidic liquid feed fuel cell systems adapted for use with portable electronic devices. More specifically, and at the present time, there has been very little in way of research and development directed toward nitric acid regeneration fuel cell systems having a recirculating nitric acid catholyte flowstream. Previous known fuel cell systems that have contemplated the use and regeneration of a nitric acid catholyte flowstream include, for example, those systems disclosed in U.S. Pat. No. 3,261,717, U.S. Pat. No. 3,281,274, U.S. Pat. No. 3,318,735, U.S. Pat. No. 3,350,227, U.S. Pat. No. 3,979,225, and U.S. Pat. No. 4,528,250. Most all of these systems, however, use a nitric acid catholyte flowstream that is regenerated with oxygen gas from the air; and as such, these fuel cell systems are not optimal for working within a closed recirculating microfluidic liquid feed fuel cell system adapted for use with a portable electronic device.

Accordingly, there is still a need in the art for new and improved nitric acid regeneration fuel cell systems. More specifically, there is a need for nitric acid regeneration fuel cell systems having a recirculating nitric acid catholyte flowstream that is regenerated with a secondary oxidant flowstream, and that incorporates microfluidic and microelectromechanical systems ("MEMS") technologies so as to achieve a high power density within a small form factor. The present invention fulfills these needs and provides for further related advantages.

SUMMARY OF THE INVENTION

In brief, the present invention is directed to nitric acid regeneration fuel cell systems that comprise: an anode; a cathode confronting and spaced apart from the anode; an anolyte flowstream configured to flowingly contact the anode, wherein the anolyte flowstream includes a fuel, preferably methanol, for reacting at the anode; a catholyte flowstream configured to flowingly contact the cathode, wherein the catholyte flowstream includes nitric acid for reacting at the cathode to thereby yield cathode reaction products that include nitric oxide and water in a catholyte effluent flowstream; and a hydrogen peroxide flowstream configured to contact and react hydrogen peroxide with the nitric oxide of the catholyte effluent flowstream at a hydrogen peroxide oxidation zone to thereby yield a regenerated nitric acid flowstream.

Preferably, the regenerated nitric acid flowstream is reused in the catholyte flowstream. In addition, the anolyte flowstream may include methanol and a sulfuric acid electrolyte, wherein the molarity of the methanol is about 1 to about 5 and the molarity of the sulfuric acid is greater than about 1. The flowrate of the anolyte flowstream generally ranges from about 2 μL/min to about 1 mL/min. Similarly, the catholyte flowstream is preferably a solution of nitric acid and sulfuric acid, wherein the molarity of the nitric acid is greater than about 0.5 and the molarity of the sulfuric acid is greater than about 1. The flowrate of the catholyte flowstream generally also ranges from about 2 μL/min to about 1 mL/min. The hydrogen peroxide flowstream is preferably a solution of hydrogen peroxide, wherein the hydrogen peroxide has a concentration of about 50 to about 70 weight percent. The flowrate of the hydrogen peroxide flowstream generally also ranges from about 2 µL/min to about 1 mL/min.

In other embodiments, the present invention is directed to a nitric acid regeneration fuel cell system, comprising: a flow-through anode; a flow-through cathode confronting and spaced apart from the anode; a plenum interposed between and contiguous with at least a portion of the flow-through anode and cathode; an anolyte flowstream that passes through the flow-through anode and into the plenum, wherein the anolyte flowstream includes a fuel (e.g. methanol) for reacting at the anode; a catholyte flowstream that passes through the flow-through cathode and into the plenum, wherein the catholyte flowstream includes nitric acid for reacting at the cathode to thereby yield cathode reaction products that include nitric oxide and water in a catholyte effluent flowstream, wherein the catholyte flowstream laminarly flows adjacent to the flow-through cathode; and a hydrogen peroxide flowstream that contacts and reacts hydrogen peroxide with the nitric oxide of the catholyte effluent flowstream at a hydrogen peroxide oxidation zone to thereby yield a regenerated nitric acid flowstream. The flux rates of the anolyte and catholyte flowstreams through the flow-through anode and the flow-through cathode, respectively, generally ranges from about 10 µL/min/cm$^2$ to about 5 mL/min/cm$^2$, whereas the flowrate of the hydrogen peroxide flowstream ranges from about 2 µL/min to about 1 mL/min.

In still other embodiments, the present invention is directed to a method of operating an electronic device comprising at least the following steps: providing and operating the nitric acid regeneration fuel cell system of claim 1 so as to generate an electrical current; and connecting the electrical current to the electronic device to thereby effectuate its operation.

These and other aspects of the several inventive embodiments disclosed herein will become more evident upon reference to the following detailed description and attached drawings. It is to be understood, however, that various changes, alterations, and substitutions may be made to the specific embodiments disclosed herein without departing from their essential spirit and scope. In addition, it is to be further understood that the drawings are intended to be illustrative and symbolic representations of certain exemplary embodiments of the present invention and as such they are not necessarily drawn to scale. Finally, it is expressly provided that all of the various references cited in this specification are incorporated herein by reference in their entireties for all purposes.

BRIEF DESCRIPTION OF THE DRAWINGS

The drawings are intended to be illustrative and symbolic representations of certain exemplary embodiments of the present invention and as such they are not necessarily drawn to scale.

DETAILED DESCRIPTION OF THE INVENTION

Figure 1:
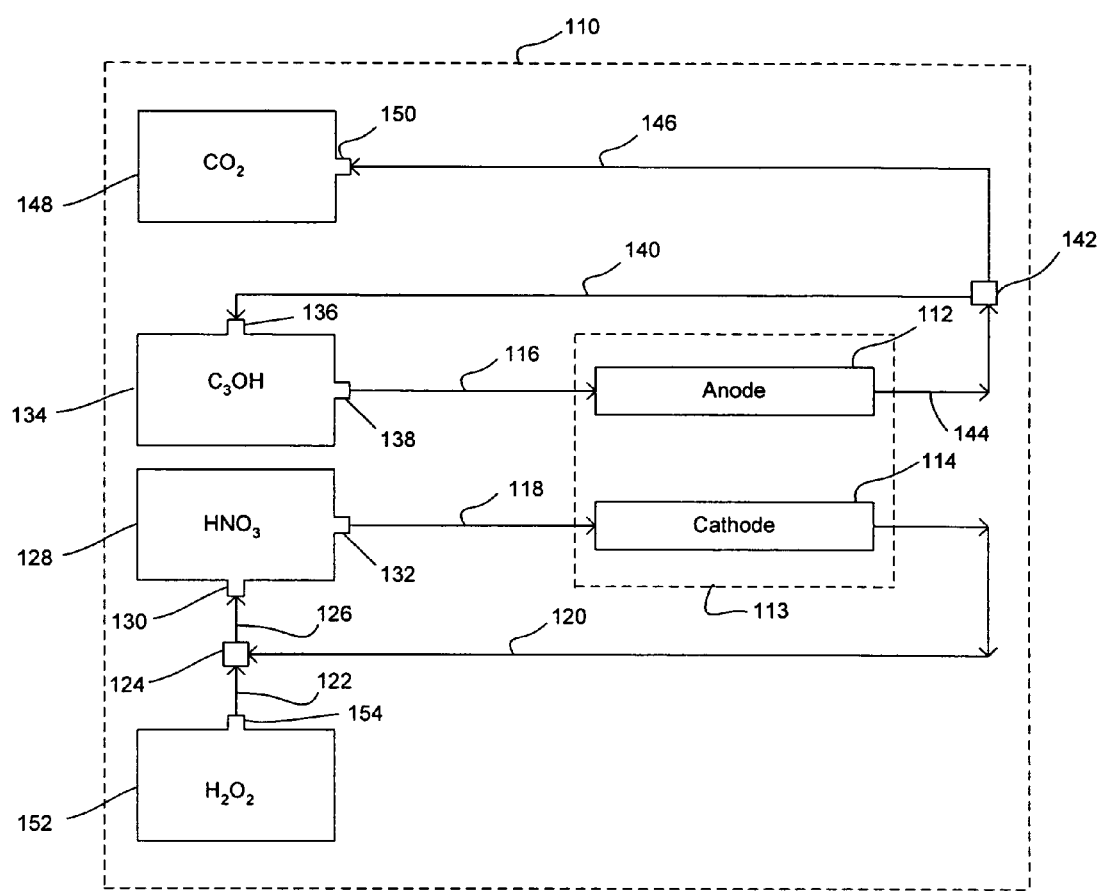
FIG. 1 illustrates a schematic flow diagram of a nitric acid regeneration fuel cell system in accordance with an embodiment of the present invention.

As noted above, the present invention is directed to a nitric acid regeneration fuel cell system having a recirculating nitric acid catholyte flowstream that is regenerated with a hydrogen peroxide flowstream. As is appreciated by those skilled in the art, a fuel cell system generally comprises a stack of electrode assemblies (referred to as an electrode stack assembly), wherein each individual electrode assembly consists essentially of two opposing electrode structures, an anode and a cathode, ionically connected together via an interposing electrolyte (e.g., polymer membrane and/or electrolyte flowstream). The interposing electrolyte of most conventional direct fuel cell systems (e.g., direct methanol fuel cell (DMFC) systems) generally consists of a solid polymer membrane (e.g., NAFION). Electrode pair assemblies having a solid polymer electrolyte (SPE) membrane are commonly referred to as membrane electrode assemblies (MEAs).

In contrast, some advanced type of fuel cell systems use "flow-through" electrodes in conjunction with microfluidic flow channels and flow cells for flowing reactant flowstreams (i.e., electrolytic fuel and oxidant flowstreams referred to herein as anolyte and catholyte flowstreams, respectively) adjacent to and/or through discrete regions of the accompanying electrode structures. As used herein, the term "microfluidic" simply refers to an article of manufacture that has one or more flow channels or flow cells with at least one dimension less than about 1 millimeter (mm). Unlike conventional direct fuel cell systems that utilize SPE membranes as the sole interposing electrolyte (of an electrode pair assembly), fuel cell systems that utilize "flow-through" electrode pair assemblies generally use "parallel" and/or "cross-flowing" (i.e., non-parallel) laminar liquid anolyte and catholyte flowstreams that have an acidic electrolyte component (e.g., $H_2SO_4$ or triflic acid) that serves as the interposing electrolyte (optionally having an additional interposing separator or third laminar electrolyte flowstream). In this way, protons ($H^+$) liberated at the anode are able to migrate through the interposing flowing anolyte and catholyte (within a flow cell) and combine with oxidant at the catalyst surface of the opposing cathode to yield reaction products. Exemplary in this regard are the fuel cell systems disclosed in commonly owned U.S. Patent Publication No. 2004/0096721 A1, which publication is incorporated herein by reference.

In view of the foregoing and with respect to nitric acid regeneration fuel cell systems of certain preferred embodiments of the present invention (and that may have conventional or flow-through electrodes), anolyte and catholyte flowstreams are used to react methanol at an anode and nitric acid at a cathode. In this preferred fuel cell system, the electrochemical reactions occurring are believed to be essentially as follows:

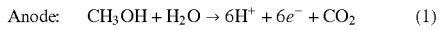
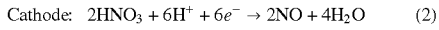
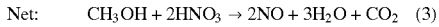

Anode:   $CH_3OH + H_2O \rightarrow 6H^+ + 6e^- + CO_2$   (1)
Cathode: $2HNO_3 + 6H^+ + 6e^- \rightarrow 2NO + 4H_2O$   (2)
Net:     $CH_3OH + 2HNO_3 \rightarrow 2NO + 3H_2O + CO_2$   (3)

In such a system and in order to reuse the catholyte effluent in a recirculating-type of fuel cell system having methanol as the fuel and nitric acid as the oxidant, it is desirable to oxidize the primary reaction product nitric oxide (NO) back to nitric acid ($HNO_3$). Therefore, and accordance with the present invention, hydrogen peroxide ($H_2O_2$) is used to contact and react with the nitric oxide (NO) of the catholyte effluent to thereby yield regenerated nitric acid ($HNO_3$), which, in turn, may be used again to react at the cathode. The overall chemical reactions occurring in this novel recirculating-type of nitric acid regeneration system are believed to be essentially as follows:

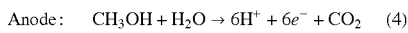
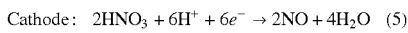
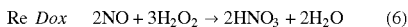
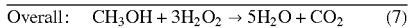

Anode:   $CH_3OH + H_2O \rightarrow 6H^+ + 6e^- + CO_2$   (4)
Cathode: $2HNO_3 + 6H^+ + 6e^- \rightarrow 2NO + 4H_2O$   (5)
Re Dox:  $2NO + 3H_2O_2 \rightarrow 2HNO_3 + 2H_2O$       (6)
Overall: $CH_3OH + 3H_2O_2 \rightarrow 5H_2O + CO_2$      (7)

In addition, and assuming that the fuel cell system (in one exemplary embodiment) has (1) an anolyte flowstream that consists essentially of a 13.3M $CH_3OH/4M\ H_2SO_4$ solution (1:1 molar ratio of $CH_3OH:H_2O$), (2) a catholyte flowstream that consists essentially of a 2M $HNO_3/4M\ H_2SO_4$ solution, and (3) a hydrogen peroxide flowstream that consists essentially of a 70% by weight solution of $H_2O_2$, then the estimated flow rates at an arbitrarily selected power level of 5.5 W is set forth below in Table 1.

TABLE 1

| | Estimated Flow Rate at 5.5 W | | | | |
|---|---|---|---|---|---|
| | In | | | Out | |
| For 5.5 W | $CH_3OH$ | $HNO_3$ | $H_2O_2$ | NO | $CO_2$ |
| mL/min | 0.14 | 1.81 | 0.20 | 88.14 | 43.46 |

These estimated flow rates are exemplary.

In another embodiment, and assuming that the fuel cell system operates as a 28 watt-hour system, and operates for 1 hour with (1) an anolyte flowstream that consists essentially of a 10M $CH_3OH/4M\ H_2SO_4$ solution (1:1 molar ratio of $CH_3OH:H_2O$), (2) a catholyte flowstream that consists essentially of a 10M $HNO_3/4M\ H_2SO_4$ solution, and (3) a hydrogen peroxide flowstream that consists essentially of a 70% by weight solution of $H_2O_2$, then the mass balance may be set forth below in Table 2.

TABLE 2

| Mass Balance of 28 Whr system operating for 1 hr. | | |
|---|---|---|
| Constituent | Initial Volume (mL) | Final Volume (mL) |
| $CH_3OH$ | 20 | 0 |
| $H_2SO_4$ (4M) | 11 | 11 |
| $H_2O$ (anode) | 19 | 10 |
| $CO_2$ | 0 | 22 g |
| Total Anolyte | 50 mL | 22 mL + 12 L gas |
| $HNO_3$ | 10 | 10 |
| $H_2O_2$ | 37.5 | 0 |
| $H_2O$ (from $H_2O_2$) | 22.5 | 41.5 |
| $H_2SO_4$ (4M) | 5.5 | 5.5 |
| $H_2O$ (cathode) | 9.5 | 28 |
| NO | 0 | 0 |
| Total Catholyte | 85 | 85 |

Thus, and in view of the foregoing and with reference to FIG. 1, the present invention in one embodiment is directed to a recirculating nitric acid regeneration fuel cell system 10 that uses a hydrogen peroxide secondary oxidant to regenerate a nitric acid primary oxidant. In this embodiment, the nitric acid regeneration fuel cell system 10 comprises an anode 12 and a cathode 14 that is confronting and spaced apart from the anode 12. The anode 12 and cathode 14 define an electrode pair assembly 13 that is ionically connected together via an interposing electrolyte (not shown), as well as to an external load (not shown) that completes the circuit. The interposing electrolyte may be a polymer membrane and/or a liquid electrolyte such as, for example, the adjacently flowing electrolytic flowstreams that are disclosed in commonly owned U.S. Application No. 2004/0058217 A1, which publication is incorporated herein by reference.

As shown, an anolyte flowstream 16 is configured to flowingly contact the anode 12, wherein the anolyte flowstream 16 includes a fuel such as, for example, methanol (or other suitable hydrocarbon such as, for example, formic acid, propanol, ethanol, and the like), for reacting at the anode 12 to thereby yield anode reaction products that primarily include unreacted fuel, water, and carbon dioxide in an anolyte effluent flowstream 44. A catholyte flowstream 18 is similarly configured to flowingly contact the cathode 14, wherein the catholyte flowstream 18 includes nitric acid as the primary oxidant for reacting at the cathode 14 to thereby yield cathode reaction products that primarily include nitric oxide, unreacted nitric acid, and water in a catholyte effluent flowstream 20. The nitric acid regeneration fuel cell system 10 further includes a hydrogen peroxide flowstream 22 that is configured to contact and react hydrogen peroxide with the nitric oxide of the catholyte effluent flowstream 20 at a hydrogen peroxide oxidation zone 24 to thereby yield a regenerated nitric acid flowstream 26. The regenerated nitric acid flowstream 26 may then preferably be reused in or as the catholyte flowstream 18.

As noted above and in some preferred embodiments, the anolyte flowstream comprises a suitable fuel such as, for example, methanol (or other suitable hydrocarbon such as, for example, formic acid, propanol, ethanol, and the like), whereas the catholyte flowstream comprises nitric acid as the primary oxidant. In addition, and in the context of fuel cell systems that utilize "flow-through" electrode pair assemblies in conjunction with adjacently flowing electrolytic flowstreams, an appropriately selected electrolyte is used in the anolyte and catholyte flowstreams. The electrolyte used preferably is an acid selected from phosphoric acid, sulfuric acid, trifluoromethane sulfonic acid (triflic acid), difluoromethane diphosphoric acid, difluoromethane disulfonic acid, trifluoroacetic acid, or a combination thereof. In some embodiments, the anolyte flowstream is an approximate 4M MeOH/4M $H_2SO_4$ liquid fuel/electrolyte mixture, and the catholyte flowstream is an approximate 2M $HNO_3$/4M $H_2SO_4$ liquid oxidant/electrolyte flowstream. The molarities of the different chemical constituents associated with the anolyte and catholyte flowstreams, may however, vary substantially from these exemplary values. For example, in the anolyte flowstream the concentration of the methanol may range from about 1-5M and the sulfuric acid may range from about 1-6M. In the catholyte flowstream the concentration of nitric acid may range from about 0.5-18M and the sulfuric acid may range from about 1-6M. In other embodiments, the selected electrolyte is contained in a separate tank or reservoir (not shown) and fed into the anolyte and catholyte flowstreams 16, 18, respectively, prior to contacting with the anode 12 and cathode 14, respectively.

As further shown in FIG. 1, the nitric acid regeneration fuel cell system 10 of the present invention may further comprise four discrete holding tanks or reservoirs for containing (1) the fuel (e.g., methanol) anolyte feed solution, (2) the nitric acid primary oxidant catholyte feed solution, (3) the hydrogen peroxide secondary oxidant feed solution, and (4) the carbon dioxide gas reaction product. More specifically, the nitric acid regeneration fuel cell system 10 may further comprise a catholyte recirculation reservoir 28 for containing the nitric acid primary oxidant (initial supply and regenerated nitric acid recirculated back from the cathode 14), wherein the catholyte recirculation reservoir 28 includes a first inlet port 30 and a first outlet port 32. As shown, the first inlet port 30 is fluidicly connected to a regenerated nitric acid flowstream 26 that exits the hydrogen peroxide oxidation zone 24, and the first outlet port 32 is fluidicly connected to the catholyte flowstream 18 that feeds the cathode 14. As is appreciated by those skilled in the art, an appropriately sized catholyte flowstream pump (not shown) may be used to transport the nitric acid primary oxidant from the catholyte recirculation reservoir 28 to the cathode 14, and also the catholyte effluent flowstream 20 to the hydrogen peroxide oxidation zone 24.

The nitric acid regeneration fuel cell system 10 may also further comprise an anolyte recirculation reservoir 34 for containing the fuel (initial supply and unreacted fuel recirculated back from the anode 12), wherein the anolyte recirculation reservoir 34 includes a second inlet port 36 and a second outlet port 38. As shown, the second inlet port 36 is fluidicly connected to a degassed anolyte effluent flowstream 40 (i.e., carbon dioxide has been substantially removed) and the second outlet port 38 is fluidicly connected to the anolyte flowstream 16 that feeds the anode 12. Because the fuel for reacting at the anode 12 yields anode reaction products that primarily include water, unreacted fuel, and carbon dioxide in an anolyte effluent flowstream 44 that exits the anode 12, the nitric acid regeneration fuel cell system 10 preferably further comprises a gas separation zone 42 configured to separate the anolyte effluent flowstream 44 into a carbon dioxide flowstream 46 (that primarily includes the separated carbon dioxide) and the degassed anolyte effluent flowstream 40 (that primarily includes water, unreacted fuel and electrolyte).

In this regard, the gas separation zone 42 is configured as a "T" shaped junction (not shown) in which the anolyte effluent flowstream 44 enters into, and in which the degassed anolyte effluent flowstream 40 and the carbon dioxide flowstream 46 exit from. The "T" shaped junction includes opposing hydrophilic and hydrophobic membranes placed across opposing channels that enable the separation process. More specifically, one side or channel of the "T" shaped junction has a transverse hydrophobic membrane that allows carbon dioxide to pass through, but not the water and unreacted fuel, thereby defining the carbon dioxide flowstream 46. Similarly, the other side or channel of the "T" shaped junction has a transverse hydrophilic membrane that allows the water and unreacted fuel to pass through, but not carbon dioxide, thereby defining the degassed anolyte effluent flowstream 40. The hydrophobic membrane is preferably a polyester or a polyvinylidene fluoride (PVDF), whereas the hydrophilic membrane is preferably TEFLON (with 0.5 μm sized pores and 85% porosity). As is appreciated by those skilled in the art, an appropriately sized anolyte flowstream pump (not shown) is preferably used to transport the fuel from the anolyte recirculation reservoir 34 to the anode 12, as well as the degassed anolyte effluent flowstream 40 back to the anolyte recirculation reservoir 34 (and a carbon dioxide flowstream 46 from the gas separation zone 42 to the carbon dioxide storage reservoir 48—see below).

The nitric acid regeneration fuel cell system 10 may also further comprise a carbon dioxide storage reservoir 48 for storing the carbon dioxide of the carbon dioxide flowstream 46, wherein the carbon dioxide storage reservoir 48 includes a third inlet port 50. As shown, the third inlet port 50 is fluidicly connected to the carbon dioxide flowstream 46. The carbon dioxide storage reservoir 48 preferably contains an absorbent material such as, for example, granules of soda lime, for absorbing the carbon dioxide. As is appreciated by those skilled in the art, soda lime is simply a mixture of sodium and calcium hydroxides. The absorbent material may, however, consist of a perfluorocarbon fluid such as, for example, perfluorooctylbromide (PFOB); alternatively, the absorbent material may be one or more of BaOH, MgOH, $Mg(OH)_2$, MgO, CaOH, $Ca(OH)_2$, LiOH, and lithium silicates like metasilicate or orthosilicate. As noted above, the anolyte flowstream pump (not shown) may also be used to transport the carbon dioxide flowstream 46 from the gas separation zone 42 to the carbon dioxide storage reservoir 48. In certain alternative embodiments, the carbon dioxide storage reservoir 48 is omitted and the carbon dioxide flowstream 46 is simply vented to the atmosphere.

The nitric acid regeneration fuel cell system 10 may also further comprise a hydrogen peroxide storage reservoir 52 for storing the hydrogen peroxide (preferably a solution of about 50 to about 70 percent by weight of hydrogen peroxide, and also containing one or more stabilizers such as, for example, colloidal stannate, sodium pyrophosphate, and also organophosphonates) that supplies the hydrogen peroxide flowstream 22, wherein the hydrogen peroxide storage reservoir 52 includes a third outlet port 54. As shown, the third outlet port 54 is fluidically connected to the regenerated nitric acid flowstream 26 via the hydrogen peroxide oxidation zone 24. In operation, the hydrogen peroxide flowstream 22 is merged with the catholyte effluent flowstream 20 at the hydrogen peroxide oxidation zone 24 to thereby yield the regenerated nitric acid flowstream 26. In other words and in this manner, hydrogen peroxide is able to contact and react with nitric oxide so as to regenerate nitric acid. It is specifically contemplated that in certain alternative embodiments, the hydrogen peroxide flowstream may be replaced with an air flowstream, thereby allowing oxygen from the air to contact and react with nitric oxide so as to regenerate nitric acid. As is appreciated by those skilled in the art, an appropriately sized hydrogen peroxide pump (not shown) is preferably used to transport hydrogen peroxide associated with the hydrogen peroxide flowstream 22 from the hydrogen peroxide reservoir 52 to the hydrogen peroxide oxidation zone 24, and also the regenerated nitric acid flowstream 26 back to the catholyte recirculation reservoir 28.

Because of the highly corrosive and reactive nature of the chemicals involved with the nitric acid regeneration fuel cell systems disclosed herein, the various electrode structures of the present invention are preferably made or derived from a silicon substrate (e.g., a n- or p-type silicon wafer) using microelectromechanical systems (MEMS) technologies such as, for example, wet chemical etching, deep reactive ion etching (DRIE), and hydrofluoric acid (HF) anodic etching as known in the art and as herein disclosed. The electrode structures of the present invention may, however, be made from one or more other materials such as, for example, a porous carbon-based material, a porous ceramic material, a porous indium-phosphide material, and/or a sol-gel material (see, e.g., commonly owned PCT International Nos. WO 01/37357, WO 02/086994, WO 03/05873, and U.S. Patent Publication Nos. US2002/0182479, US2003/0194598 which publications are incorporated herein by reference in their entireties).

In certain preferred embodiments of the present invention, the electrode pair assemblies are based, in large part, on porous flow-through substrates and support structures that have catalyst particles dispersed (contiguously or noncontiguously) on selected pore surfaces. In these embodiments, the surfaced adhered catalyst material is generally readily accessible to flowing gaseous and/or liquid reactant streams. Moreover, and in the context of some embodiments of the present invention, it has been discovered that silicon-based substrates and/or support structures are particularly useful as electrodes for fuel cell systems (especially for microfluidic direct methanol fuel cell systems), in part because such substrates and/or support structures are able to provide a high surface area to bulk volume ratio, have good mechanical strength, and are compatible with thin/thick films which are often needed for making selected electrical connections. Because of these physical characteristic, among others, and because silicon-based substrates and/or support structures are amenable to micro-fabrication techniques, the electrochemical and fuel cells of the present invention may be manufactured within a small form factor, but with sufficient power densities to power portable electronic devices.

Accordingly, and without limitation to any particular methodology, the silicon-based electrode pair assemblies and related flow channels and flow cells of certain preferred embodiments may be manufactured by using standard microelectromechanical systems (MEMS) technologies such as, for example, wet chemical etching, deep reactive ion etching (DRIE), hydrofluoric acid (HF) anodic etching, alkaline etching, plasma etching, lithography, and electrodeposition. By using these techniques, a silicon substrate useful for carrying a catalyst may be produced, wherein the silicon substrate may have any number of pores and pores sizes such as, for example, random or ordered pore arrays—including pore arrays having selected pore diameters, depths, and distances relative to one another. In short, the present invention is inclusive of all silicon substrate support structures, including combinations thereof, that have any number of possible porosities and/or void spaces associated therewith.

Thus, the electrode structures of certain preferred embodiments of the present invention generally comprise a silicon substrate (with a thickness preferably ranging from about 50 to about 500 microns, and more preferably from about 300 to about 500 microns) having one or more discrete porous regions disposed across a top surface of the substrate. In addition, each of the one or more discrete porous regions is preferably defined by a plurality of acicular or columnar pores (i.e., passageways) that extend through the substrate (with average diameter ranging from about 0.5 to about 10 microns). The plurality of acicular or columnar pores define inner pore surfaces, and the inner pore surfaces may have an optional conformal electrically conductive layer thereon. In some embodiments, the pores are substantially perpendicular to the top and bottom surfaces of the substrate. In some other embodiments, the pores each have a diameter of about 5 microns and are spaced apart from one another about 8 microns (from pore center axis to adjacent pore center axis) so as to yield substrate having an approximate 30% porosity.

Porous silicon substrates (and/or support structures) useful as electrode structures may be formed by silicon micro-machining and/or wet chemical techniques (employed by the semiconductor industry) such as, for example, anodic polarization of silicon in hydrofluoric acid. As is appreciated by those skilled in the art, the anodic polarization of silicon in hydrofluoric acid (HF) is a chemical dissolution technique and is generally referred to as HF anodic etching. This technique has been used in the semiconductor industry for wafer thinning, polishing, and the manufacture of thick porous silicon films. (See, e.g., Eijkel, et al., "A New Technology for Micromachining of Silicon: Dopant Selective HF Anodic Etching for the Realization of Low-Doped Monocrystalline Silicon Structures," *IEEE Electron Device Ltrs.*, 11(12):588-589 (1990)). In the context of certain preferred embodiments of the present invention, it is to be understood that the porous silicon may be microporous silicon (i.e., average pore size <2 nm), mesoporous silicon (i.e., average pore size of 2 nm to 50 nm), or macroporous silicon (i.e., average pore size >50 nm). The pores are preferably arranged as a series of parallelly aligned acicular or columnar pores that extend into or through the silicon substrate. Although the pores may be angled with respect to top and bottom surfaces of the silicon substrate, they are preferably substantially perpendicular to the top and bottom surfaces of the substrate.

For example, porous silicon substrates may be formed by a photoelectrochemical HF anodic etching technique, wherein selected oxidation-dissolution of silicon occurs under a controlled current density. (See, e.g., Levy-Clement et al., "Porous n-silicon Produced by Photoelectrochemical Etching," *Applied Surface Science,* 65/66: 408-414 (1993); M. J. Eddowes, "Photoelectrochemical Etching of Three-Dimensional Structures in Silicon," *J. of Electrochem. Soc.,* 137(11): 3514-3516 (1990).) An advantage of this relatively more sophisticated technique over others is that it is largely independent of the different principal crystallographic planes associated with single-crystal silicon wafers (whereas most anisotropic wet chemical etching methods have very significant differences in rates of etching along the different principal crystallographic planes).

Figure 2A:
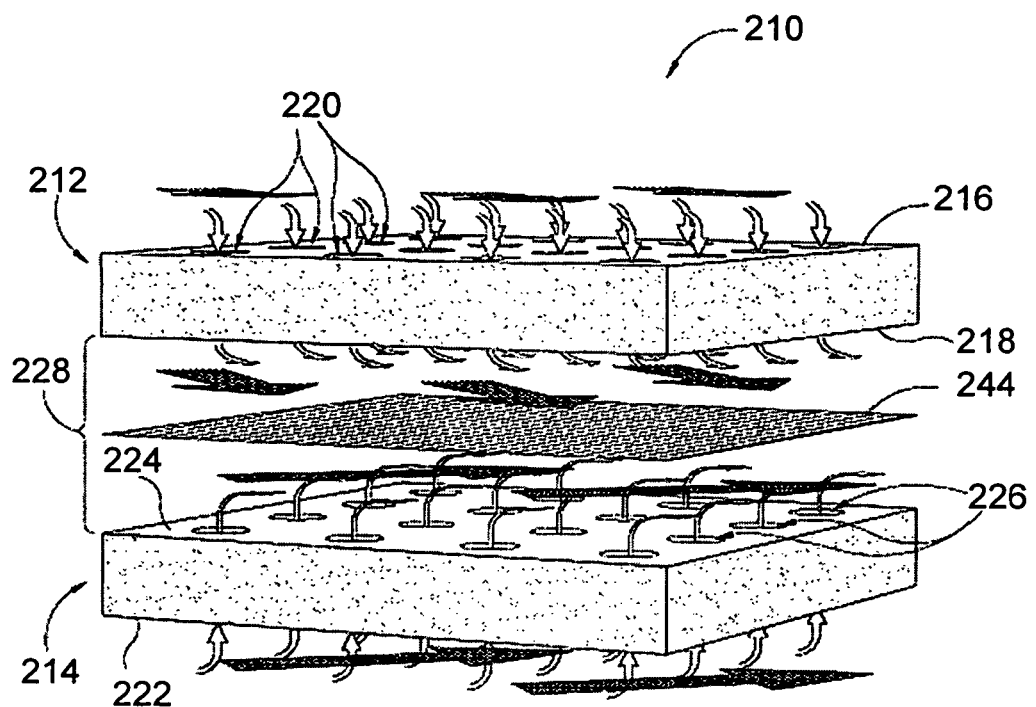
FIG. 2A illustrates an exploded side pictorial view of a portion of a fuel cell in accordance with an embodiment of the present invention, wherein the fuel cell comprises a first flow-through electrode; a second flow-through electrode spaced apart from the first flow-through electrode; a plenum interposed between and contiguous with at least a portion of the first and second flow-through electrodes; a first fluid that passes through the first flow-through electrode and into the plenum, wherein the first fluid laminarly flows adjacent to the first electrode in a first flow direction; and a second fluid that passes through the second flow-through electrode and into the plenum, wherein second fluid laminarly flows adjacent to the second electrode in a second flow direction, and wherein the first and second flow directions are different from each other.
Figure 2B:
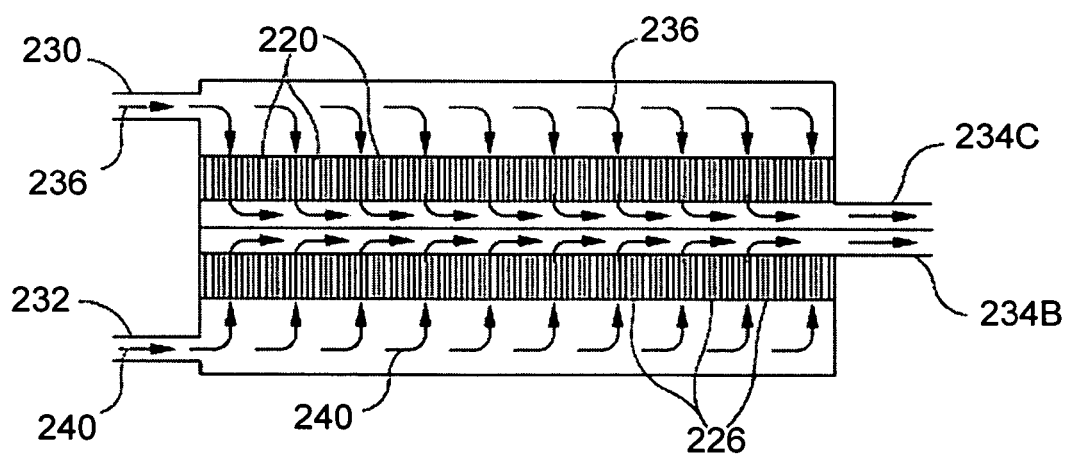
FIG. 2B illustrates a side view of the portion of the fuel cell depicted in FIG. 2A.

In view of the foregoing and with reference to FIGS. 2A-B, the nitric acid regeneration fuel cell system of the present invention is in some embodiments configured such that the anode defines a first flow-through electrode (preferably composed of silicon), and the cathode defines a second flow-through electrode (also preferably composed of silicon). In these embodiments, the first flow-through electrode 212 has an outer side 216 and an inner side 218 with a plurality passageways 220 (e.g., acicular pores) extending from the outer side 216 to the inner side 218. The second flow-through electrode 214 also has an outer side 222 and an inner side 224 also with a plurality of passageways 226 (e.g., acicular pores) extending from the outer side 222 to the inner side 224. As shown, the second flow-through electrode 214 is spaced apart from the first flow-through electrode 212 such that the inner sides 218, 224 of each flow-through electrode 212, 214 are confronting each other. In addition, a plenum 228 (also sometimes referred to as a "flow cell") is interposed between, and contiguous with, at least a portion of the inner sides 218, 224 of each flow-through electrode 212, 214.

As best shown in FIG. 2B, an anolyte flowstream inlet zone 230 outwardly bounds the outer side 216 of the first flow-through electrode 212, and a catholyte flowstream inlet zone 232 outwardly bounds the outer side 222 of the second flow-through electrode 214. In addition, an anolyte effluent flowstream outlet zone 234C and a catholyte outlet zone 234B outwardly bound a portion of the inner sides 218, 224 of each flow-through electrode 212, 214. In this configuration, an anolyte flowstream 236 enters the anolyte flowstream inlet zone 230 and passes through the plurality of passageways 220 of the first flow-through electrode 212 and flows laminarly adjacent to the inner side 218 of the first flow-through electrode 212 (in a first average flow direction) and exits through the anolyte effluent flowstream outlet zone 234C. Similarly, a catholyte flowstream 240 enters the catholyte flowstream inlet zone 232 and passes through the plurality of passageways 226 of the second flow-through electrode 214 and flows laminarly adjacent to the inner side 224 of the second flow-through electrode 214 (in a second average flow direction) and exits through the catholyte effluent flowstream outlet zone 234B. The first and second average flow directions are preferably different from each other; however, they may be the same.

Stated somewhat differently, the anolyte flowstream 236 is flowing and flows through the passageways 220 (e.g., acicular pores) of the first flow-through electrode 212 (and in so doing the reactant (e.g., methanol) is able to react on, for example, surface adhered platinum:ruthenium ($Pt_x:Ru_y$) catalyst particles that line the pore surfaces) and adjacent to the first flow-through electrode 212 within the plenum 228. Similarly, the catholyte flowstream 240 is flowing and flows through the passageways 226 (e.g., acicular pores) of the second flow-through electrode 214 (and in so doing the nitric acid primary oxidant) is able to react on, for example, surface adhered platinum (Pt) catalyst particles that line the pore surfaces) and adjacent to the second flow-through electrode 214 within the plenum 228. As shown, the anolyte flowstream 236 and the catholyte flowstream 240 flow adjacent and cross-directional with respect to each other within the plenum 228 and exit at the outlet zones 234B, 234C. The anolyte flowstream 236 and the catholyte flowstream 240 both generally flow laminarly. In this way, the two liquid laminar flowstreams 236, 240 are allowed to diffusively contact each other at a fluid interface 244 within the plenum 228 thereby allowing for $H^+$ ions to diffuse from the anode-side catalyst particle reaction sites to cathode-side catalyst particle reaction sites. The fluid interface 244 may, however, be replaced with a structural separator component. The separator may be a fibrous glass membrane, a metallic membrane such as, for example, a palladium foil, or a polymeric membrane such as, for example, NAFION; provided, however, that the separator is substantially permeable to $H^+$ ions.

For purposes of illustration and not limitation, the following examples more specifically disclose various aspects of the present invention.

EXAMPLE 1

Performance of Porous Silicon-Based Cathode Reacting with Nitric Acid Flowstream An investigation was conducted to determine the performance characteristics associated with a cathode half-cell made from a porous silicon-based substrate. For our investigation, a single 2 cm by 2 cm square coupon electrode having an 0.89 cm by 0.89 cm active porous hydrodynamic flow-through region was made by HF anodic etching of a silicon wafer etching. In this regard, an n-type silicon wafer having a resistively of 23-27 ohm-cm, a (100) crystal orientation, and a thickness of 525 µm was initially masked and etched with KOH to form an ordered array of etched pits (each pit of about 5 µm in diameter). The silicon substrate was then etched with 4 wt % HF—$H_2O$ solution with an additional 1 vol % (of the HF solution) surfactant (NCW-1001, Wako Chemicals, Inc., USA) at a current density of about 10 mA/cm$^2$ at 14° C. A potential of 1.4 V (min) to 6 V (max) was applied with backside illumination at 880 nm. The silicon substrate was etched for about 15 hours. The resulting acicular or columnar pores were perpendicular into the wafer with an average depth of 400 about microns. The backside of the sample was ground with a polisher to create the porous hydrodynamic flow-through region (having about 39% porosity). The silicon substrate was then doped with a solid-source (Techneglas PhosPlus) in combination with a spin on (Honeywell P-8545) and then coated with a 1 micron thick Au film via evaporation.

The resulting substrate or sample coupon (i.e., Sample No. U0005-15-E) had a measured conductivity of 0.34Ω and an average pore diameter of about 3.79 µm (with the largest pore size of about 7.151 µm). A platinum catalyst was deposited on the pore surfaces (of the active porous hydrodynamic flow-through window region) by electroplating. More specifically, a solution containing 20 mM $H_2PtCl_6.XH_2O$ acid, 25% $CH_3CH_2OH$, and 1M $H_2SO_4$ was flowed through the hydrodynamic flow-through channels of the coupon at a rate of 156.3 µL/min/cm$^2$. The coupon was then plated galvanostatically using a current of 20 mA/cm$^2$ for 80 min. The total plating charge was 96.7 Coulombs. The catalyzed coupon was then tested as a cathode half-cell at 60° C. (+/−4° C.) by flowing varied $HNO_3$ flowstreams through the coupon. Ag/AgCl was used as the reference electrode.

Figure 3:
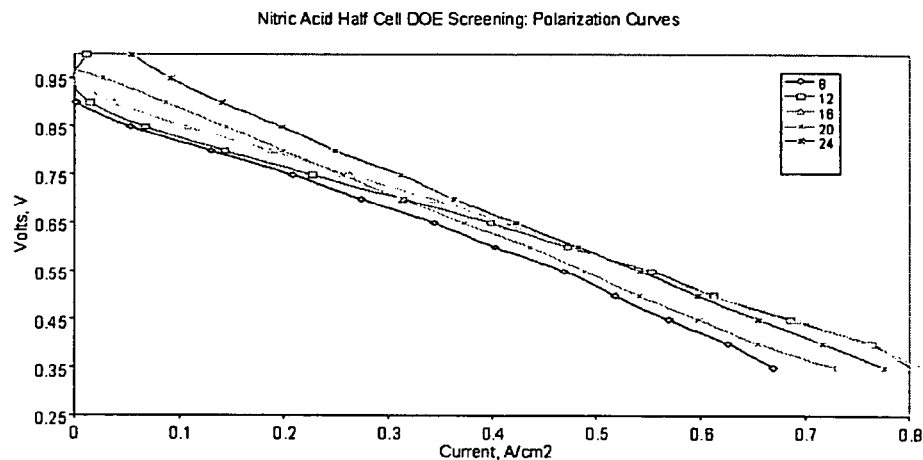
FIG. 3 shows the performance (polarization) characteristics associated with a cathode half-cell made from a porous silicon-based substrate in accordance the embodiment (of the present invention) set forth in Example 1. In this figure, current density in A/cm$^2$ (abscissa) versus voltage in V (ordinate) has been plotted as best fit polarization curves for 8M, 12M, 16M, 20M, and 24M HNO$_3$ flowstreams, wherein each flowstream has a constant flow rate of 125 µL/min.
Figure 4:
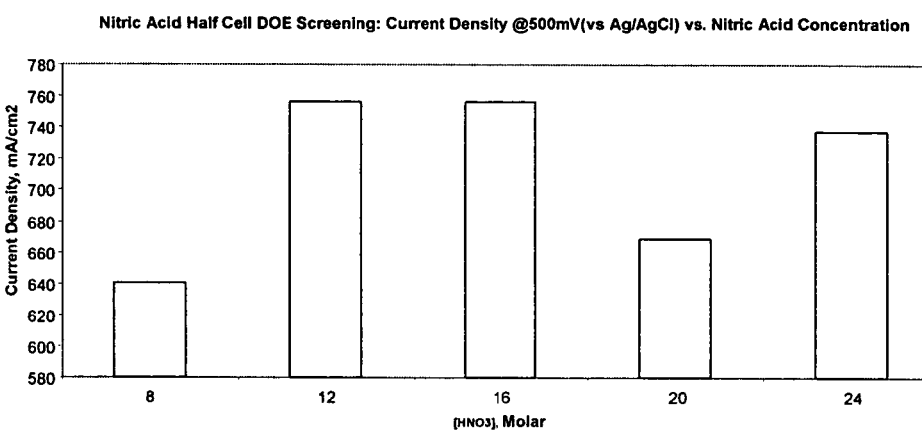
FIG. 4 shows the performance (constant voltage) characteristics associated with a cathode half-cell made from a porous silicon-based substrate in accordance the embodiment (of the present invention) set forth in Example 1. In this figure, molarity (abscissa) versus current density in mA/cm$^2$ (ordinate) has been plotted as a bar graph for 8M, 12M, 16M, 20M, and 24M HNO$_3$ flowstreams, wherein each flowstream has a constant flow rate of 125 µL/min.
Figure 5:
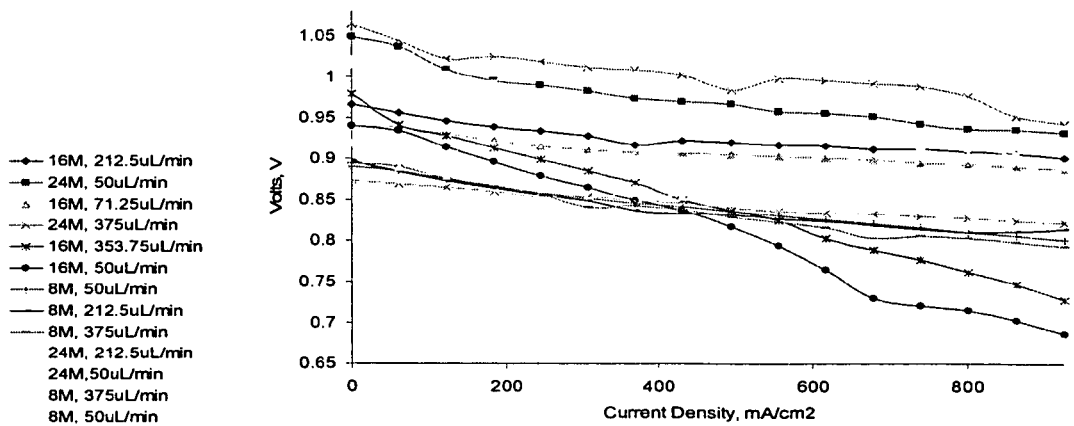
FIG. 5 shows the performance (constant voltage) characteristics associated with a cathode half-cell made from a porous silicon-based substrate in accordance with the embodiment (of the present invention) set forth in Example 1. In this figure, current density in mA/cm$^2$ (abscissa) versus voltage in V (ordinate) has been plotted as best fit polarization curves for 13 different HNO$_3$ flowstreams, namely, (1) a 16M 212.5 µL/min. HNO$_3$ flowstream, (2) a 24M 50 µL/min. HNO$_3$ flowstream, (3) a 16M 71.25 µL/min. HNO$_3$ flowstream, (4) a 24M 375 µL/min. HNO$_3$ flowstream, (5) a 16M 353.75 µL/min. HNO$_3$ flowstream, (6) a 16M 50 µL/min. HNO$_3$ flowstream, (7) a 8M 50 µL/min. HNO$_3$ flowstream, (8) a 8M 50 µL/min. HNO$_3$ flowstream, (9) a 8M 375 µL/min. HNO$_3$ flowstream, (10) a 24M 212.5 µL/min. HNO$_3$ flowstream, (11) a 24M 50 µL/min. HNO$_3$ flowstream, (12) a 8M 375 µL/min. HNO$_3$ flowstream, and (13) a 8M 50 µL/min. HNO$_3$ flowstream.

To determine the performance characteristics of the cathode half-cell, an experimental design was developed wherein the concentration of the $HNO_3$ flowstream (i.e., catholyte flowstream) through the coupon was varied from 8 to 24M $HNO_3$ and the flux was varied from 62.5 to 468.8 µL/min/cm$^2$. After an open circuit potential (OCV) was measured for 5 min., the polarization of the cathode was recorded galvanostatically by changing the current from 0 to −750 mA in 50 mA/30 sec increments. An initial screening suggested the further testing at fixed $HNO_3$ flowstream flow rate of 125

μL/min. The results of this testing have been plotted and are shown in FIGS. 2 and 3, respectively. The results of further testing in which the flow rate and molarity of the $HNO_3$ flowstream were varied is shown in FIG. 4.

EXAMPLE 2

Regeneration with a Hydrogen Peroxide Flowstream

A further investigation was conducted in order to demonstrate the feasibility of regenerating catholyte effluent flowstreams produced in a manner similar to those of Example 1. More specifically, various concentrated hydrogen peroxide flowstreams were mixed together with various catholyte effluent flowstreams via small tubing at a reaction zone and it was repeatedly demonstrated that an approximate 78% conversion rate of NO back to $HNO_3$ could be achieved.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A nitric acid regeneration fuel cell system, comprising:
a flow-through anode composed of silicon having an outer side and an inner side, and a plurality of passageways extending from the outer side to the inner side wherein the passageways comprise columnar pores having average diameter ranging from 0.5 to 10 microns;
a cathode composed of silicon confronting and spaced apart from the anode, the cathode having a plurality of passageways extended through the cathode wherein the passageways comprise columnar pores having average diameter ranging from 0.5 to 10 microns;
a micro fluidic anolyte flowstream flowingly contacting and passing through the anode by way of the plurality of passageways, wherein substantially all of the anolyte flowstream enters from the outer side and exits out of the inner side of the flow-through anode and, wherein the anolyte flowstream includes a fuel for reacting at the anode;
a micro fluidic catholyte flowstream flowingly contacting the cathode, wherein the catholyte flowstream includes nitric acid for reacting at the cathode to thereby yield cathode reaction products that include nitric oxide and water in a catholyte effluent flowstream;
a hydrogen peroxide flowstream configured to contact and react with the nitric oxide of the catholyte effluent flowstream at an oxidation zone outside the cathode to thereby yield a regenerated nitric acid flowstream joining the catholyte flowstream, and
a gas separation zone configured to separate an anolyte effluent flowstream into a carbon dioxide flowstream and a degassed anolyte effluent flowstream,
wherein the gas separation zone is configured as a T-shape junction, and
wherein the T-shape junction comprises opposing hydrophilic and hydrophobic membranes placed across opposing exit pathways, whereby the carbon dioxide flowstream and the degassed anolyte effluent flowstream separate.

2. The nitric acid regeneration fuel cell system of claim 1, further comprising:
wherein the regenerated nitric acid flowstream is reused in the catholyte flowstream.

3. The nitric acid regeneration fuel cell system of claim 1, further comprising:
wherein the fuel is methanol.

4. The nitric acid regeneration fuel cell system of claim 1, further comprising:
wherein the anolyte flowstream includes methanol and an acid electrolyte.

5. The nitric acid regeneration fuel cell system of claim 1, further comprising:
wherein the anolyte flowstream is a methanol and a sulfuric acid solution, and
wherein the molarity of the methanol is about 2 and the molarity of the sulfuric acid is about 2.

6. The nitric acid regeneration fuel cell system of claim 1, further comprising:
wherein the catholyte flowstream further includes an acid electrolyte.

7. The nitric acid regeneration fuel cell system of claim 1, further comprising:
wherein the catholyte flowstream is a solution of the nitric acid and sulfuric acid, and
wherein the molarity of the nitric acid is about 18 and the molarity of the sulfuric acid is about 2.

8. The nitric acid regeneration fuel cell system of claim 1, further comprising:
wherein the hydrogen peroxide flowstream is a solution of the hydrogen peroxide, and
wherein the hydrogen peroxide has a concentration of about 70 weight percent.

9. The nitric acid regeneration fuel cell system of claim 1 wherein the cathode is a second flow-through electrode having an outer side and an inner side, and wherein the second flow-through electrode includes a plurality of passageways extending from the outer side to the inner side.

10. The nitric acid regeneration fuel cell system of claim 1, further comprising:
a catholyte recirculation reservoir for containing the nitric acid,
wherein the catholyte recirculation reservoir includes a first inlet port and a first outlet port, and
wherein the first inlet port is fluidically connected to the catholyte effluent flowstream and the first outlet port is fluidically connected to the catholyte flowstream.

11. The nitric acid regeneration fuel cell system of claim 1, further comprising:
an anolyte recirculation reservoir for containing the fuel,
wherein the anolyte recirculation reservoir includes a second inlet port and a second outlet port, and
wherein the second inlet port is fluidically connected to a degassed anolyte effluent flowstream and the second outlet port is fluidically connected to the anolyte flowstream.

12. The nitric acid regeneration fuel cell system of claim 1, further comprising:
a hydrogen peroxide storage reservoir for storing the hydrogen peroxide of the hydrogen peroxide flowstream,
wherein the hydrogen peroxide storage reservoir includes a third outlet port, and
wherein the third outlet port is fluidically connected to the regenerated nitric acid flowstream via the hydrogen peroxide oxidation zone.

13. A nitric acid regeneration fuel cell system, comprising:
- an anode composed of silicon having a plurality of passageways extending through the anode wherein the passageways comprise columnar pores having average diameter ranging from 0.5 to 10 microns;
- a cathode composed of silicon confronting and spaced apart from the anode, the cathode having a plurality of passageways extending through the anode wherein the passageways comprise columnar pores having average diameter ranging from 0.5 to 10 microns;
- an anolyte flowstream flowingly contacting and passing through the anode, wherein the anolyte flowstream includes a fuel for reacting at the anode;
- a catholyte flowstream flowingly contacting the cathode, wherein the catholyte flowstream includes nitric acid for reacting at the cathode to yield cathode reaction products in a catholyte effluent flowstream;
- a hydrogen peroxide flowstream;
- an oxidation zone outside the cathode for accepting the catholyte effluent flowstream and the hydrogen peroxide flowstream for returning a regenerated nitric acid flowstream joining the catholyte flowstream to the cathode,
- wherein hydrogen peroxide from the hydrogen peroxide flowstream reacts with the catholyte effluent flowstream at the oxidation zone to yield the regenerated nitric acid flowstream;
- a gas separation zone configured to separate an anolyte effluent flowstream into a carbon dioxide flowstream and a degassed anolyte effluent flowstream,
- wherein the gas separation zone is configured as a T-shape junction,
- wherein the anolyte effluent flowstream enters the T-shape junction through an entrance of the T-shape junction,
- wherein the carbon dioxide flowstream and the degassed anolyte effluent flowstream leave the T-shape junction through its respective exit pathway of two exit pathways of the T-shape junction,
- wherein the T-shape junction comprises opposing first and second membranes placed across opposing exit pathways, whereby the carbon dioxide flowstream and the degassed anolyte effluent flowstream separate,
- wherein the first membrane is composed of polytetrafluoroethylene,
- wherein the second membrane is composed of at least one of a polyester material and a polyvinylidene fluoride material,
- wherein the first membrane comprises 0.5 μm diameter pores, and
- wherein the first membrane comprises 85% porosity.

14. A nitric acid regeneration fuel cell system of claim 1, further comprising:
- wherein the anolyte effluent flowstream enters the T-shape junction through an entrance of the T-shape junction.

15. A nitric acid regeneration fuel cell system of claim 1, further comprising:
- wherein the carbon dioxide flowstream and the degassed anolyte effluent flowstream leave the T-shape junction through its respective exit pathway of two exit pathways of the T-shape junction.

* * * * *